Oct. 14, 1952     R. A. CARLSON     2,613,778
MULTIPLE FRICTION CLUTCH
Filed Dec. 7, 1944     2 SHEETS—SHEET 1
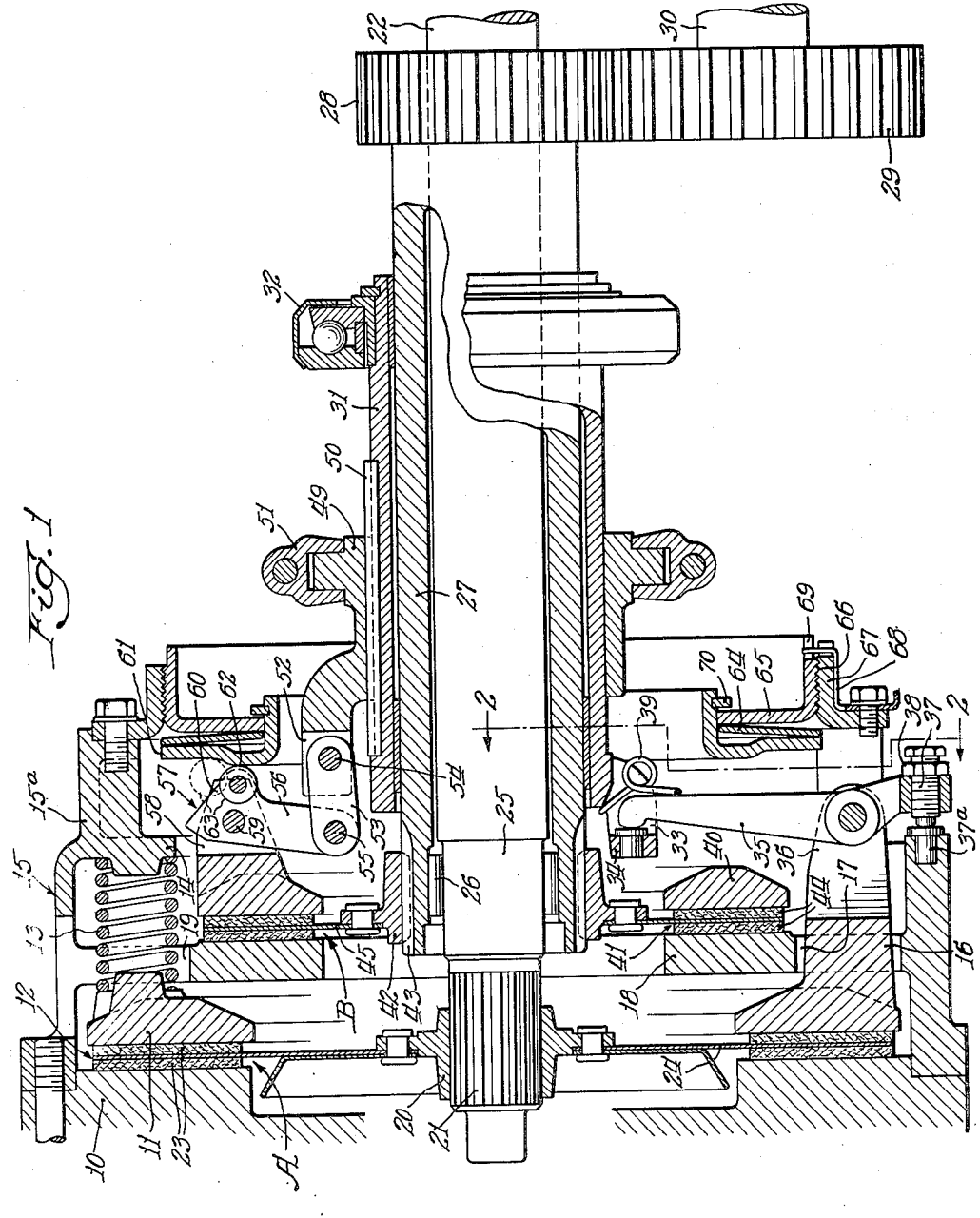
Inventor:
Raymond A. Carlson

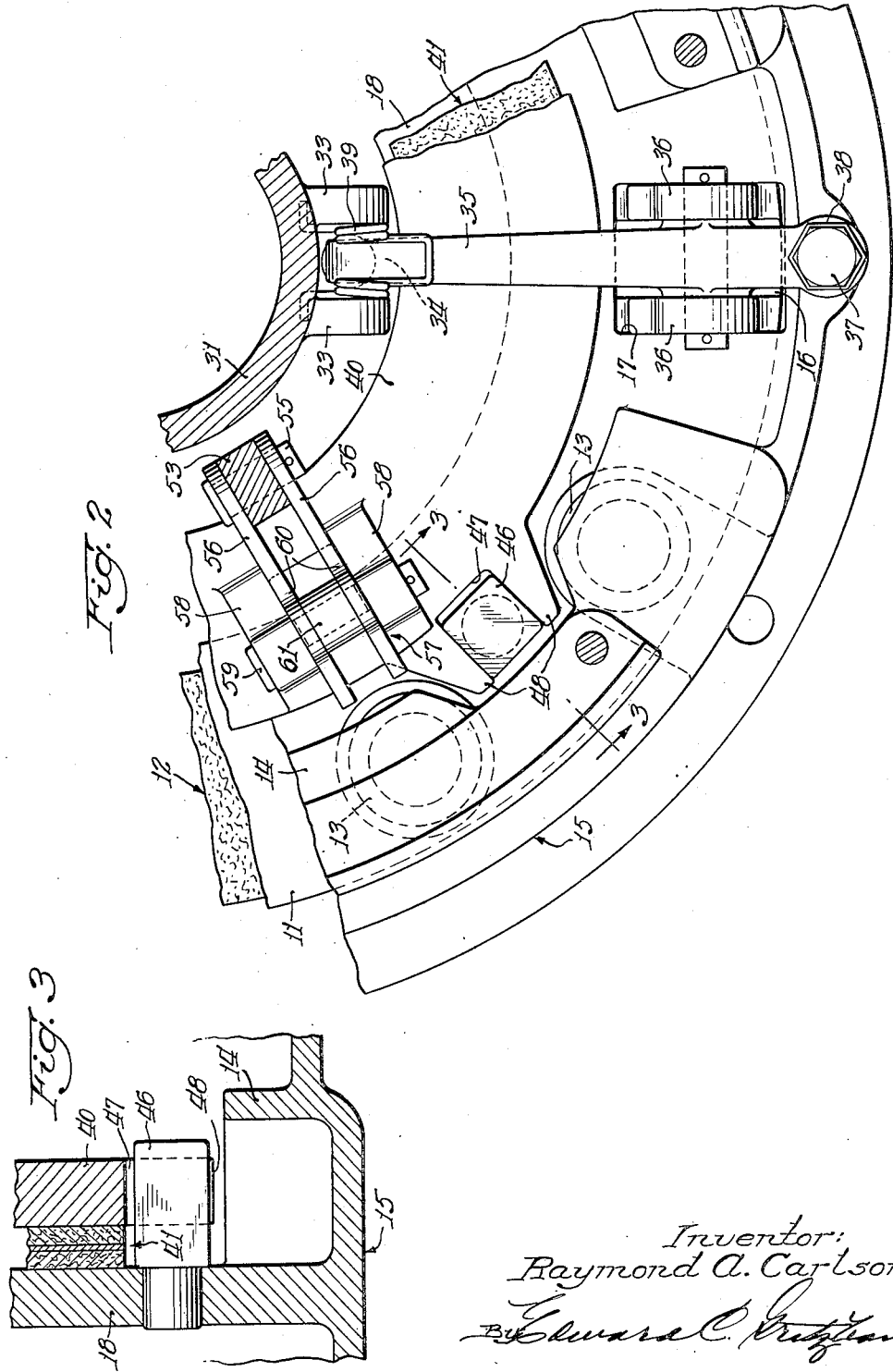

Patented Oct. 14, 1952

2,613,778

UNITED STATES PATENT OFFICE 2,613,778

MULTIPLE FRICTION CLUTCH

Raymond A. Carlson, Rockford, Ill., assignor to Borg-Warner Corporation, Chicago, Ill., a corporation of Illinois Application December 7, 1944, Serial No. 567,013

32 Claims. (Cl. 192—48)

The present invention relates to friction clutches, and more especially to clutches of the dual or multiple type for effecting a plurality of power take-offs.

It is one of the principal objects of this invention to simplify the construction of a multiple type clutch such as contemplated herein and to improve the efficiency, operation, and dependability of such clutch.

Another principal object hereof is to provide an annular member between two friction clutch assemblies, said member adapted to effect a positive drive connection between a driving member and the pressure plate of one of the clutch assemblies. In addition to effecting this drive connection, the annular member also constitutes the back plate of the second clutch assembly.

A further principal object of the improvements resides in a housing anchored to a driving member and carrying an inner annular partition that is interposed between two clutch assemblies to function as the back plate of the second clutch assembly that is alongside the first clutch assembly in spaced relation to the driving member.

Still another object is to provide two clutch assemblies in a housing carried by the driving member or flywheel, said clutches being selectively engaged either independent of or simultaneous with each other and thus provide an arrangement for separate power take-offs.

It is also an object hereof to effect the independent operation of separate clutches that surround and are carried by a pair of telescoped driven members or shafts. In the present arrangement there are individual release means for the clutches that are actuated by shift collars telescoped with each other and operating on telescoped output members or shafts.

In the present improvements the two clutches are in close side-by-side positions which effects an extremely compact construction that is adapted for assembly in a motor driven vehicle where the space may be of a constricted character. Furthermore, this particular combination clutch is constructed and arranged so that one or both clutches may be released by moving the control levers in the same direction, and the engagement of either or both clutches is accomplished singly or in combination by the opposite movement of said levers.

Additional objects, aims, and advantages of the improvements contemplated herein will be apparent to persons skilled in the art after the construction and operation of the clutch arrangement is understood from the within description. It is preferred to accomplish the numerous objects of this invention and to practice the same in substantially the manner hereinafter fully described and as more particularly pointed out in the claims. Reference is now made to the accompanying drawings that form a part of this specification, wherein:

Fig. 1 is an axial sectional view of a clutch arrangement embodying the invention;

Fig. 2 is a fragmentary elevational view; and

Fig. 3 is a transverse section along the plane of line 3—3 on Fig. 2.

The drawings are to be understood as being more or less of a schematic character for the purpose of disclosing a typical or preferred form of improvements contemplated herein, and in these drawings like reference characters identify the same parts in different views.

The embodiment of the improvements shown in the drawings comprises an arrangement adaptable for use in a motor vehicle, said arrangement including two clutch assemblies designated generally as A and B that are adapted to be operatively coupled to a driving member 10 which may be the flywheel of the vehicle engine. One of the clutches is adapted to couple the engine to the transmission for driving the vehicle, and the other clutch is adapted to couple the engine to an output shaft for driving an accessory of the vehicle.

The clutch assembly A comprises a pressure plate 11 and a driven member 12 adapted to be frictionally engaged between the driving member 10 and the pressure plate 11 by coiled springs 13 interposed between pressure plate 11 and an annular internal flange 14 on the cylindrical wall 15a of the clutch cover or housing 15 that is anchored to the flywheel 10 for rotation therewith. The springs 13 furnish the pressure for clutch engagement of the assembly A. Torque is transmitted from flywheel 10 to pressure plate 11 by lateral lugs 16 projecting from said plate through slots 17 in an annular wall 18 extending radially inward from the housing wall 15a. Thus a positive driving connection is effected between the driving member or flywheel 10 and the clutch pressure plate 11. The annular wall 18 also constitutes the back plate member of the second clutch assembly B, and since it is located between the pressure plate 11 and the spring seating flange 14, it has holes 19 to accommodate the springs 13.

The driven member 12 includes a hub 20 splined at 21 on a driven shaft 22 and a pair of friction facings 23 mounted on the hub 20 through the medium of the clutch disc 24 anchored to the hub. The facings are secured on opposite sides of the radially outer portion of the clutch disc between the pressure plate 11 and the flywheel 10.

Beyond its splines the driven shaft 22 has a shouldered region 25 to receive anti-friction devices 26 for rotatably journaling a second driven shaft 27 of tubular cross section that is telescoped on shaft 22 for rotative movement with said shaft or independently thereof. Driven shaft 22 is coupled preferably to the transmission for driving the vehicle, and shaft 27 carries a take-off gear 28 meshed with a gear 29 on a countershaft 30 for driving an auxiliary device either on or adjacent the vehicle.

An elongated clutch release collar 31 is slidably reciprocated on the outer tubular shaft 27 by an actuator or thrust bearing 32. At its end nearest the clutch assembly A, this release collar 31 has axially projecting L-shaped lugs 33 the lateral arms 34 of which are engaged with the radially inner portions of the release levers 35 that are pivotally carried between pairs of ears 36 on the torque transmitting or driving lugs 16 of the pressure plate 11. As seen in Fig. 1, the release levers 35 are at the side of annular member 18 away from the clutch assembly A as well as beyond clutch assembly B. The portions of release levers 35 radially outward from their pivots have transverse bolts 37 screwed into them and secured in place by lock nuts 38. The projecting shanks of bolts are engaged with headed plugs 37a on the adjacent portions of housing 15. Thus adjustable fulcrums are effected for the release levers. When the radially inner ends of levers 35 are moved to the right, (Fig. 1) on their fulcrums 37 the pressure plate 11 will be moved against the action of springs 13 to release the clutch members. Suitably shaped spring devices 39, carried by release collar 31, press against the radially inner portions of levers 35 to urge them into engagement with the lugs 33 to insure constant contact between the levers and the collar lugs 33, and to prevent rattle.

The clutch assembly B comprises the annular wall 18, functioning as a back plate, a pressure plate 40, and a driven member 41. This driven member 41 includes a hub 42 splined at 43 on the adjacent end portion of tubular driven shaft 27 and a pair of friction facings 44 mounted on the hub 42 through the medium of the clutch disc 45 secured to said hub. The facings 44 are attached to the peripheral region of the clutch disc 45 that is between the confronting surfaces of back plate 18 and pressure plate 40. Driving connection between pressure plate 40 and the driving member of flywheel 10 is effected by means of driving studs 46 anchored in the annular wall or back plate 18 to project into recesses 47 in bosses 48 extending radially from the edge of pressure plate 40, as shown in detail in Fig. 3.

A clutch release collar 49 is keyed at 50 on the release collar 31 of the clutch assembly A for rotation therewith and for longitudinal sliding movement thereon when shifted by an actuator or yoke 51. At its end nearest the pressure plate 40 release collar 49 has bifurcated lugs 52 in which toggle links 53 are pivotally carried on pins 54 that have pivoted connection by pins 55 to the long arms 56 of bell crank member or cam devices 57. The angular portions of these bell cranks or cams 57 are received between spaced pairs of ears 58 projecting laterally from pressure plate 40 and are fulcrumed on pins 59. The short arms 60 of the bell cranks or cams project away from pressure plate 40 toward an abutment assembly comprising a spring loaded annulus 61 of L-shape cross section having an annular embossment 62 for engagement with rollers 63 on adjacent ends of bell crank arms 60. When release collar 49 is shifted to the left to position it as shown in Fig. 1, the bell cranks or cams 57 will be rocked to a position where the rollers 63 will be over-center on the embossment 62 as shown in Fig. 1 and clutch assembly B will be engaged to rotate the tubular driven shaft 27. Shifting of release collar 49 to the right rocks bell cranks or cams 57 causing rollers 63 to move away from over-center and ride off embossment 62, thereby releasing pressure plate 40 and uncoupling the members of clutch assembly B. It is apparent that this clutch assembly B and the tubular shaft 27 driven thereby are operable independently of the other assembly A and its driven shaft 22, permitting the selective operation of the two assemblies.

The annulus 61 is normally urged toward pressure plate 40 by spring means comprising a Belleville washer type spring 64 the inner periphery of which engages the inner region of an annular stop ring 65 of L-shape cross section, and the outer peripheral region of the spring 64 is adapted to engage the annulus 61 at the peripheral region of the latter, so as to transfer the reaction spring load to the annulus 61. Spring 64 is characterized by a negative rate so that the reaction pressure afforded thereby increases rather than decreases as the clutch members wear in. This rate is fairly low so as to avoid too great an increase in the amount of pressure required for engaging the clutch.

The stop ring 65 has external threads 66 on its cylindrical portion that screw into the internally threaded cylindrical portion of an annular bracket or carrier 67 anchored to a convenient portion of the cover or housing 15. Suitably shaped clips 68 have their inwardly projecting ends engaged in recesses 69 at the margin of the stop ring 65 to lock said ring against rotation after being adjusted. The inwardly projecting portion of stop ring 65 extends to the cylindrical portion of annulus 61 and a snap ring 70, seated in a groove in this cylindrical portion, limits movement of the annulus toward the bell crank or cam devices 57 that operate the clutch assembly B. This arrangement is effective to vary the relationship of the annulus 61, the spring 64, and the stop ring 65 with respect to the bell crank or cam devices 57. This variation is readily accomplished merely by screwing the stop ring inwardly or outwardly the desired distance in the bracket or carrier 67 and then locking the stop ring against rotative movement by means of the clips 68. From the foregoing it is apparent that the abutment assembly may be shifted rearwardly a distance so that cam actuated rollers 63 will not engage stop-ring embossment when the collar 49 is shifted, thus rendering the second or rear clutch assembly B inoperative.

While this invention has been disclosed in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. In a friction clutch, a first driven plate; a flywheel and a first pressure plate between which said first driven plate is adapted to be engaged; an annular back plate in axially spaced relation to said first pressure plate; a second pressure plate alongside said back plate; a second driven plate between said back plate and second pressure plate for engagement therewith; spring means normally urging said first pressure plate into engagement with said first driven plate; means for selectively operating the respective pressure plates including over-center cam means for effecting engagement and locking of the second pressure plate and second driven plate; a clutch housing attached to and driven by said flywheel, said back plate being secured to said housing; means for effecting a driving connection between said first pressure plate and said back plate; and means for effecting a driving connection between said second pressure plate and said back plate.

2. In a friction clutch, a first driven plate; a flywheel and a pressure plate between which said driven clutch plate is adapted to be engaged; a clutch housing attached to said flywheel for encompassing said plates; an annular clutch back plate connected to and extending radially inward from said housing in spaced relation to said pressure plate; means effecting a driving connection between said pressure plate and said back plate; a second driven plate; a second pressure plate between which and said back plate said second driven plate is adapted to be engaged; means for effecting a driving connection between said second pressure plate and said back plate; telescoped driven shafts connected to the respective driven plates; spring means for urging said first pressure plate into engagement with said first driven plate; independently operable clutch release means for the respective pressure plates including over-center cam means for effecting engagement and locking of the second pressure and second plates and telescoped collars for operating said release means, said collars being mounted for individual sliding movement on said driven shafts for selectively operating said pressure plates.

3. In a friction clutch, a first driven plate; a flywheel and a pressure plate between which said driven plate is adapted to be engaged; a housing attached to said flywheel; an annular clutch back plate extending radially inward from said housing in spaced relation to said pressure plate; means effecting a driving connection between said pressure plate and said back plate; a second pressure plate confronting said back plate; a second driven plate adapted to be engaged between said back plate and said second pressure plate; over-center cam means for moving said second pressure plate toward said back plate and locking the second pressure plate in engagement with said second driven plate; telescoped driven shafts connected to the respective driven plates; and telescoped operating collars independently slidable axially of said driven shafts, one collar having connection with said first pressure plate, and the other collar having connection with said cam means.

4. In a friction clutch, a first driven plate; a flywheel and a pressure plate between which said driven plate is adapted to be engaged; a second driven plate; a back plate and a second pressure plate between which said second driven plate is adapted to be engaged, said back plate having a driving connection with said flywheel, telescoped shafts operatively connected to the respective driven plates; spring means normally urging said first pressure plate into engagement with said first driven plate; lever means for releasing the first pressure plate from said first driven plate; and cam means separate from and operated independently of said lever means for moving said second pressure plate into locked engagement with the second driven plate.

5. In a friction clutch, a first driven plate; a flywheel and a pressure plate between which said driven plate is adapted to be engaged; a second driven plate; a back plate and a second pressure plate between which said second driven plate is adapted to be engaged, said back plate having a driving connection with said flywheel; spring means normally urging said first pressure plate into engagement with said first driven plate; and cam means for moving said second pressure plate into locked engagement with said second driven plate; and independently operable means for selectively releasing the respective pressure plates to effect either separate or simultaneous operation of said pressure plates.

6. In a friction clutch, a first driven plate; a flywheel and a pressure plate between which said driven plate is adapted to be engaged; a housing attached to said flywheel; a second driven plate; a back plate and a second pressure plate between which said second driven plate is adapted to be engaged, said back plate being integral with and extending radially inward from said housing for effecting a driving connection with said flywheel; spring means normally urging said first pressure plate into engagement with said first driven plate; release means for operating the first pressure plate; and over-center cam means operable in a direction to engage said second pressure plate with said second driven plate and effect a locking thereof in engaged position.

7. A multiple friction clutch comprising a driving member; a driven member; a driven sleeve rotatable on said driven member; a friction clutch plate adapted for movement with said driven member; a pressure plate yieldably urged into engagement with said clutch plate to frictionally couple said drive and driven members; a back plate carried by said driving member back of said pressure plate; a second friction clutch plate carried by said sleeve for engagement with said back plate; a second pressure plate adapted to be moved into engagement with said second clutch plate to couple said driving member to said sleeve; lever means for moving said first-named pressure plate to release said first-named clutch plate from said driving member; over-center bell-crank lever means for moving said second pressure plate to locking engagement with said second clutch plate; and means individual to each said lever means for separately operating the same.

8. A multiple friction clutch as defined in claim 7 wherein the driven member comprises a shaft, and the driven sleeve comprises a tubular shaft telescoped on and independently rotatable with respect to the first shaft; there being a clutch housing attached to the driving member and having the back plate integral therewith; means providing a driving connection between the first pressure plate and the back plate; and other means providing a driving connection between the second pressure plate and the back plate.

9. In a friction clutch, a first driven plate; a flywheel and a spring-biased pressure plate between which said driven plate is normally engaged; a housing attached to said flywheel; a second driven plate; a back plate and a second pressure plate between which said second driven plate is normally disengaged, said back plate being formed integrally with said housing; means providing a driving connection between said first pressure plate and said back plate; other means providing a driving connection between said second pressure plate and said back plate; telescoped driven shafts connected to the respective driven plates; means for releasing the first pressure plate including a shift collar movable longitudinally of said driven shafts having operative connection with the first pressure plate; over-center cam means on said second pressure plate; and a second shift collar movable longitudinally of said driven shafts for operating said cam means to positively engage and lock said second pressure plate and said second driven plate.

10. A friction clutch as defined in claim 9 wherein the shift collars are slidingly telescoped with respect to each other and also with respect to the driven shafts, thereby to effect selective release and engagement of the first and second pressure plates.

11. A multiple clutch comprising a driving member; a driven shaft; a driven sleeve on said shaft adapted for rotation independently thereof; a normally engaged first clutch assembly frictionally coupling said shaft to said driving member; a normally disengaged second clutch assembly adapted to be engaged to frictionally couple said sleeve to said driving member; an annulus connected to and rotatable with said driving member, said annulus providing a back plate for said second clutch assembly; means effecting a driving connection between the pressure plate of said first clutch assembly and back plate annulus; other means effecting a driving connection between a pressure plate of said second clutch assembly and said back plate; independently operable shift collars movable longitudinally of said sleeve; and means connecting said shift collars to the respective pressure plates of said first and second clutch assemblies, the connection between a shift collar and the second clutch assembly comprising bell-crank means fulcrumed on the pressure plate of said assembly and movable to an over-center position to engage said assembly and also to effect a locking thereof in such engaged position.

12. A multiple friction clutch comprising a flywheel; a normally engaged spring biased friction clutch assembly for connecting a driven shaft to said flywheel; release means for disengaging said clutch assembly; a second friction clutch assembly drivingly connected with said flywheel, said second clutch assembly being normally disengaged and adapted to connect a second driven shaft to said flywheel; and means independent of said release means for effecting engagement of said second clutch assembly including an abutment; cam means fulcrumed on second clutch assembly; and a release collar adapted for movement axially of said driven shafts to effect a rocking of said cam means to engage said abutment and thereby to engage and lock said second clutch assembly.

13. A multiple friction clutch comprising a flywheel; inner and outer telescoped shafts adapted to be separately driven by said flywheel; a spring biased friction clutch assembly normally connecting said inner shaft to said flywheel; release means for disconnecting said clutch assembly from said flywheel; a second friction clutch assembly drivingly connected with said flywheel, said assembly being normally disengaged and adapted to connect said outer driven shaft to said flywheel; and means independent of said release means for effecting engagement of said second clutch assembly including an abutment; cam means fulcrumed on second clutch assembly; and a release collar movable axially of said driven shafts for rocking said cam means to engage said abutment and thereby to effect engagement and locking of said second clutch assembly.

14. A multiple friction clutch comprising a flywheel; inner and outer telescoped shafts adapted to be separately driven by said flywheel; a friction clutch assembly for said inner shaft; spring means biasing said clutch assembly normally into engagement with said flywheel; release means for disconnecting said clutch assembly from said flywheel; a back plate having driving connection with said flywheel; a second friction clutch assembly normally disengaged and adapted to be engaged to connect said outer shaft to said back plate; and means independent of said release means for effecting engagement of said second clutch assembly including abutment means; cam means fulcrumed on said second clutch assembly for coaction with said abutment means; and a release collar movable axially of said shafts adapted to rock said cam means to engage said abutment means and thereby to effect engagement and locking of said second clutch assembly.

15. A multiple clutch arrangement comprising a flywheel; a friction clutch assembly; means for effecting engagement of said clutch assembly with said flywheel; a normally disengaged second friction clutch assembly including a back plate; a clutch cover driven by said flywheel and drivingly connected to said back plate; and means within said cover for engaging said second clutch assembly comprising an annulus; a stop-ring carried by said cover in axially spaced relation to said annulus; spring means between said ring and annulus to urge said annulus toward said second clutch assembly; and clutch operating means adapted for movement in one direction to effect engagement of said second clutch assembly, and movable in another direction to release said second clutch assembly; said stop-ring being adjustable axially of said cover to vary the relationship of said annulus, spring and stop-ring.

16. A multiple clutch arrangement comprising a flywheel; a friction clutch assembly; means for effecting engagement of said clutch assembly with said flywheel; a clutch cover drivingly connected with said flywheel and having a cylindrical rear portion; a second friction clutch assembly within said cover and including a back plate driven by said cover; and means within said cover for operating said second clutch assembly comprising an annulus; a stop-ring axially spaced from said annulus and adjustably engaged with the cylindrical portion of said cover; spring means between said ring and annulus to urge said annulus toward said second clutch assembly; and means adapted for movement in one direction to transmit the force of said spring means to effect engagement of said second clutch assembly, said means being also movable in another direction to relieve said second clutch assembly of such spring force; the axial adjustment of said stop-ring being adapted to vary the relationship of said annulus, spring and stop-ring.

17. A multiple clutch arrangement comprising a flywheel; a friction clutch assembly; means for effecting engagement of said clutch assembly with said flywheel; a normally disengaged second friction clutch assembly including a back plate; a clutch cover driven by said flywheel and drivingly connected to said back plate, said cover encompassing said clutch assemblies and having a cylindrical rear portion; an annulus; a stop-ring of L-shape cross section arranged with its radial flange adjacent said annulus and having its axial flange threaded to said cylindrical portion of said cover for axial adjustment with respect thereto; and means within said cover for operating said second clutch assembly comprising a Belleville type spring of negative rate between said ring and annulus to urge said annulus toward said second clutch assembly; and clutch operating means adapted for movement in one direction to transmit the force of said Belleville spring to effect engagement of said second clutch assembly, said means being also movable in another direction to relieve said second clutch assembly of such spring force; the axial adjustment of said stop-ring being adapted to vary the relationship of said annulus, spring and stop-ring.

18. A clutch rotatable about an axis and comprising a flywheel; a clutch cover drivingly connected with said flywheel and having a cylindrical rear portion; a normally disengaged friction clutch assembly within said cover and including a back plate driven by said cover; and means within said cover for operating said clutch assembly comprising an axially movable annulus having an axially extending portion and a radially extending portion disposed outwardly of said last mentioned portion; a stop-ring of L-section arranged with its radial flange adjacent the radially extending portion of said annulus with the inner periphery of said flange engaging the axially extending portion of said annulus for guiding said annulus during axial movement thereof and for supporting said annulus concentric to the axis of said clutch, said ring having its axial flange threaded to said cylindrical rear portion of said cover for adjustment with respect thereto; spring means between the radial flange of said stop-ring and the radially extending portion of said annulus for urging said annulus toward said clutch assembly; said annulus, stop-ring and spring means constituting an axially adjustable abutment assembly; cam means fulcrumed on the pressure plate of said clutch assembly and operative on said annulus to energize said spring means; and means adapted to move said cam means to one position whereby the force of said spring means is effective to frictionally engage said clutch assembly, said means also adapted to move said cam means to another position whereby to release said clutch assembly; the axial adjustment of said abutment assembly away from said clutch assembly being effective to prevent clutch engagement by said cam means.

19. A multiple friction clutch comprising a flywheel; a normally engaged spring biased friction clutch assembly for connecting a driven shaft to said flywheel; release means for disengaging said clutch assembly; a second friction clutch assembly drivingly connected with said flywheel, said second clutch assembly being normally disengaged and adapted to connect a second driven shaft to said flywheel; and means for effecting engagement of said second clutch assembly including an abutment; cam means fulcrumed on second clutch assembly; and a release collar adapted for movement axially of said driven shafts to effect a rocking of said cam means to engage said abutment and thereby to engage and lock said second clutch assembly, said abutment being adjustable axially of said driven shafts to render said cam means ineffective to couple said second clutch assembly to its driven shaft.

20. A multiple friction clutch comprising a flywheel; inner and outer telescoped shafts adapted to be separately driven by said flywheel; a spring biased friction clutch assembly normally connecting said inner shaft to said flywheel; release means for disconnecting said clutch assembly from said flywheel; a second friction clutch assembly drivingly connected with said flywheel, said assembly being normally disengaged and adapted to connect said outer driven shaft to said flywheel; and means for effecting engagement of said second clutch assembly including an abutment; cam means fulcrumed on second clutch assembly; and a release collar movable axially of said driven shafts for rocking said cam means to engage said abutment and thereby to effect engagement and locking of said second clutch assembly, said abutment being adjustable axially of said driven shafts to render said cam means ineffective to couple said second clutch assembly to said outer shaft.

21. A multiple friction clutch comprising a flywheel; inner and outer telescoped shafts adapted to be separately driven by said flywheel; a friction clutch assembly for said inner shaft; spring means biasing said clutch assembly normally into engagement with said flywheel; release means for disconnecting said clutch assembly from said flywheel; a back plate having driving connection with said flywheel; a second friction clutch assembly normally disengaged and adapted to be engaged to connect said outer shaft to said back plate; and means for effecting engagement of said second clutch assembly including abutment means; cam means fulcrumed on second clutch assembly for coaction with said abutment means; and a release collar movable axially of said shafts adapted to rock said cam means to engage said abutment means and thereby to effect engagement and locking of said second clutch assembly, said abutment means being adjustable axially of said shafts to render said cam means ineffective to operate said second clutch.

22. A multiple friction clutch arrangement comprising a drive member and telescoped driven members; a normally engaged first friction clutch assembly and a normally disengaged second friction clutch assembly, said assemblies being adapted to drivingly connect said drive member to the respective driven members; cam means operable to effect engagement of the friction members of said second clutch; and abutment means normally engageable by said cam means for operating said second clutch assembly, said abutment means being adjustable away from said second clutch assembly whereby to prevent engagement of said assembly when said cam means is operated.

23. A multiple friction clutch arrangement comprising a drive member and telescoped driven members; a normally engaged first friction clutch assembly and a normally disengaged second friction clutch assembly, said assemblies being adapted to drivingly connect said drive member to the respective driven members; cam means operable to effect engagement of the friction members of said second clutch; and abutment means normally engageable by said cam means for operating said second clutch assembly, said cam means being movable to over-center position for engaging said second clutch assembly whereby to lock said second clutch assembly in engaged position.

24. A multiple friction clutch arrangement comprising a drive member and telescoped driven members; a normally engaged first friction clutch assembly and a normally disengaged second friction clutch assembly, said assemblies being adapted to drivingly connect said drive member to the respective driven members; cam means operable to effect engagement of the friction members of said second clutch assembly; and abutment means normally engageable by said cam means for operating said second clutch assembly, said cam means being movable to over-center position for engaging said second clutch assembly whereby to lock said second clutch assembly in engaged position, said abutment means being adapted for rearward adjustment away from said second clutch assembly whereby to prevent engagement of said second clutch assembly when said cam means is operated.

25. A multiple friction clutch arrangement comprising a drive member and telescoped driven members; a normally engaged first friction clutch assembly and a normally disengaged second friction clutch assembly, said assemblies being adapted to drivingly connect said drive member to the respective driven members; means operable to effect engagement of the friction members of said second clutch assembly; and abutment means normally engageable by said last-mentioned means for operating said second clutch assembly, said abutment means being adjustable away from said second clutch assembly whereby to prevent engagement of said second clutch assembly when said operable means is operated.

26. A friction clutch assembly comprising a rotatable driving element; a rotatable driven element; a driven plate connected to said driven element; a pressure plate connected to said driving element for rotation therewith and movable relative thereto into and out of engagement with said driven plate; annular carrier means connected to said driving element; an annular element having an axially extending portion extending within and slidably engaging the inner peripheral edge of said carrier means for movement axially thereof and having a radially extending portion spaced from said carrier means; spring means between said carrier means and the radially extending portion of said annular element and over-center cam means connected to said pressure plate and having engagement with said radially extending portion of said annular element during movement of said cam means to one position to energize said spring means and thereby move said pressure plate into locking engagement with said driven plate, said cam means being movable to another position to release the engagement of said driven plate and said pressure plate.

27. A friction clutch assembly rotatable about an axis and comprising a rotatable driving element; a rotatable driven element; a driven plate connected to said driven element; a pressure plate connected to said driving element for rotation therewith and movable relative thereto into and out of engagement with said driven plate; an annular carrier concentric with the axis of said assembly and connected to said driving element and having a radially disposed portion; a rigid annular element extending within said carrier and slidably supported on the radially inner peripheral edge of the radially disposed portion of said annular carrier for axial movement and to position said element concentric to the axis of said assembly and having a radially extending portion spaced from the radially disposed portion of said carrier, said annular element and said carrier having limited movement relative to each other; a Belleville type spring between said radially extending portions of said carrier and said annular element and over-center cam means connected to said pressure plate and having engagement with said radially extending portion of said annular element during movement of said cam means to one position to energize said Belleville spring and thereby move said pressure plate into locking engagement with said driven plate, said cam means being movable to another position to release the engagement of said driven and pressure plates.

28. A friction clutch assembly comprising a rotatable driving element; a rotatable driven element; a driven plate connected to said driven element; a pressure plate connected to said driving element for rotation therewith and for movement relative thereto into and out of engagement with said driven plate; an annular carrier connected to said driving element and having a radially disposed portion; a rigid annular element extending within and slidably supported on said radially disposed portion of said annular carrier for movement axially thereof and having a radially extending portion spaced from the radially disposed portion of said carrier, said carrier and said annular element having limited bodily movement relative to each other; spring means between said radially extending portions of said carrier and said annular element and cam means connected to said pressure plate and having engagement with said radially extending portion of said annular element during movement of said cam means to one position to energize said spring means thereby urging said pressure plate into engagement with said driven plate, said cam means being movable to another position to release the engagement of said driven and pressure plates.

29. A multiple friction clutch assembly comprising rotatable driving means; a first friction clutch assembly including a driven disc, and a pressure member connected to said driving means for rotation therewith and movable along the axis of rotation thereof into and out of engagement with said driven disc; a second friction clutch assembly comprising a driven plate, and a pressure plate connected to and rotatable with said driving means and movable along the axis of rotation thereof into and out of engagement with said driven plate; means for effecting engagement of said pressure plate and said driven plate comprising a carrier rotatable with said driving means, an annulus slidably mounted on said carrier for movement relative to said carrier and in spaced relation to said second clutch assembly, spring means between said carrier and said annulus and operative to urge said annulus towards said second clutch assembly, over-center cam means between said annulus and said second clutch assembly and movable to an over-center position wherein force of said spring means is transmitted through the over-center cam means to said pressure plate to yieldingly effect locking engagement of said pressure plate and said driven plate, disengagement of said pressure plate and said driven plate being effected by movement of said cam means out of said over-center position and the release of the force of said spring means on said cam means.

30. A multiple friction clutch assembly comprising rotatable driving means; a first friction clutch assembly including a driven disc, and a pressure member connected to said driving means for rotation therewith and movable along the axis of rotation thereof into and out of engagement with said driven disc; a second friction clutch assembly comprising a driven plate, and a pressure plate connected to and rotatable with said driving means and movable along the axis of rotation thereof into and out of engagement with said driven plate; means for effecting engagement of said pressure plate and said driven plate comprising carrier means connected to and rotatable with said driving means, an annulus slidably mounted on said carrier means for movement relative thereto and having a radially extending portion in spaced relation to said second clutch assembly, spring means between said carrier means and said radially extending portion of said annulus and operative to urge said annulus towards said second clutch assembly, over-center cam means between said annulus and said second clutch assembly connected to said pressure plate and having engagement with said annulus, said cam means being movable to an over-center position wherein force of said spring means is transmitted through the over-center cam means to said pressure plate to yieldingly effect engagement of said pressure plate and said driven plate, disengagement of said pressure plate and said driven plate being effected by movement of said cam means out of said over-center position and the release of said spring pressure on said cam means.

31. A multiple friction clutch assembly comprising rotatable driving means; a friction clutch assembly including a driven disc, and a pressure member connected to said driving means for rotation therewith and movable along the axis of rotation thereof into and out of engagement with said driven disc; a second friction clutch assembly comprising a driven plate, and a pressure plate connected to and rotatable with said driving means and movable along the axis of rotation thereof into and out of engagement with said driven plate; means for effecting engagement of said pressure plate and said driven plate, comprising an annular carrier having a radially disposed portion connected to said driving means, an annulus extending within and slidably mounted on said radially disposed portion of said carrier for movement relative to said carrier and having a radially disposed portion spaced from said radially disposed portion of said carrier, spring means between said radially disposed portions of said carrier and said annulus and operative to urge said annulus towards said second clutch assembly, over-center cam means between the radially disposed portion of said annulus and said second clutch assembly and movable to an over-center position wherein force of said spring means is transmitted through the over-center cam means to said pressure plate to yieldingly effect engagement of said pressure plate and said driven plate, disengagement of said pressure plate and said driven plate being effected by movement of said cam means out of said over-center position and the release of said spring pressure on said cam means.

32. A friction clutch assembly comprising rotatable driving means; a driven plate; a pressure plate connected to and rotatable with said driving means and movable along the axis of rotation thereof into and out of engagement with said driven plate; means for effecting engagement of said pressure plate and said driven plate comprising a carrier rotatable with said driving means and including a radially extending portion, an annulus positioned adjacent said radially extending portion of said carrier and slidably mounted on an axially extending surface of said radially extending portion of said carrier for bodily movement relative to said carrier, spring means between said radially extending portion of carrier and said annulus and operative to urge said annulus towards said pressure plate, over-center cam means between said annulus and said pressure plate and movable to an over-center position to energize said spring means whereby the force of said spring means is transmitted through the over-center cam means to said pressure plate to yieldingly effect locking engagement of said pressure plate and said driven plate, disengagement of said pressure plate and said driven plate being effected by movement of said cam means out of said over-center position and the release of the force of said spring means on said cam means.

RAYMOND A. CARLSON.

REFERENCES CITED

The following references are of record in the file of this patent:

UNITED STATES PATENTS

| Number | Name | Date |
|---|---|---|
| 2,057,559 | Backer | Oct. 13, 1936 |
| 2,129,361 | Ruesenberg et al. | Sept. 6, 1938 |
| 2,136,049 | Hering | Nov. 8, 1938 |
| 2,237,322 | West | Apr. 8, 1941 |
| 2,251,367 | Miller | Aug. 5, 1941 |
| 2,275,068 | Ruesenberg et al. | Mar. 3, 1942 |
| 2,280,356 | Spase et al. | Apr. 21, 1942 |